June 16, 1959   J. V. HAMMOND   2,890,789
SLAB CONVEYOR AND DUMPING MECHANISM
Filed June 12, 1958   2 Sheets-Sheet 1
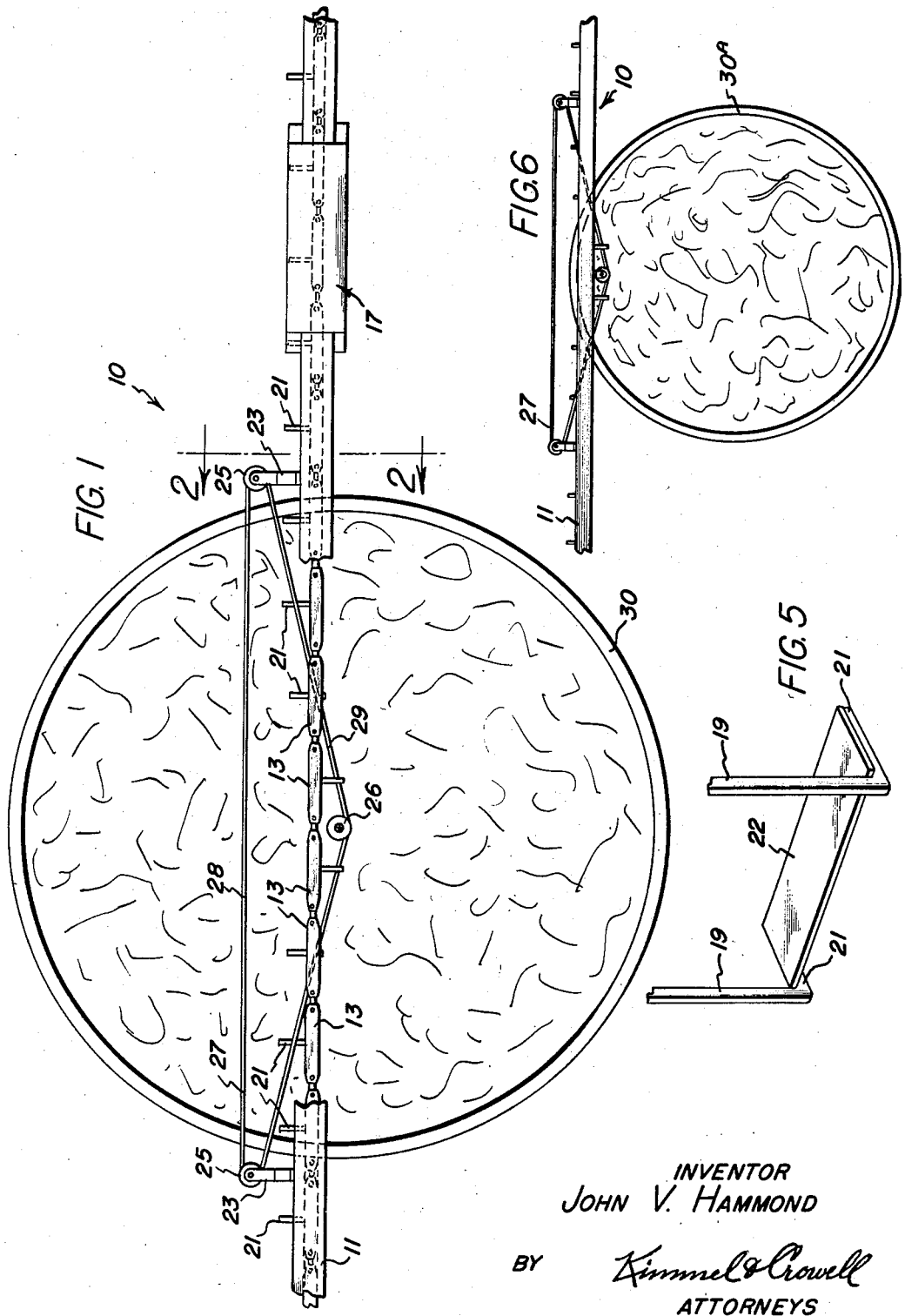
INVENTOR
JOHN V. HAMMOND
BY Kimmel & Crowell
ATTORNEYS

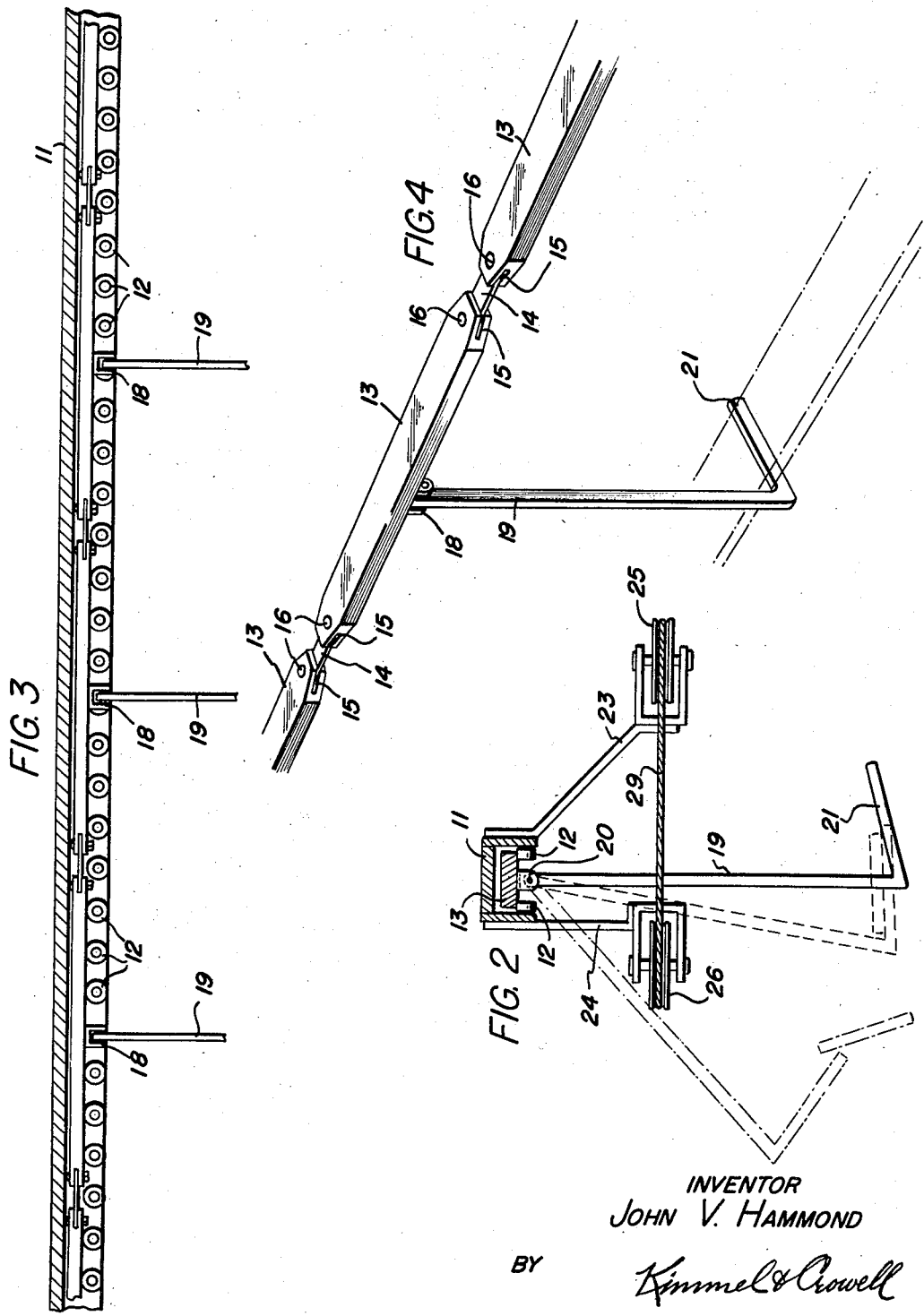

United States Patent Office 2,890,789
Patented June 16, 1959

2,890,789

SLAB CONVEYOR AND DUMPING MECHANISM

John V. Hammond, Spangler, Pa.

Application June 12, 1958, Serial No. 741,633

3 Claims. (Cl. 198—177)

The present invention relates to slab conveying and dumping mechanisms, and more particularly to such mechanisms used for moving slabs away from a saw mill to a burning pit.

The primary object of the invention is to provide an endless conveying mechanism having means associated therewith for automatically dumping the load supporting members of the conveyor when in the desired position.

Another object of the invention is to provide a mechanism of the class described above wherein the dumping mechanism is supported by the conveyor support.

A further object of the invention is to provide a conveying mechanism of the class described above having means associated therewith for handling relatively short slab lengths.

A still further object of the invention is to provide a slab conveying and dumping mechanism of the class described above which is inexpensive to manufacture, simple to erect, and which is efficient in moving the slabs away from the saw mill.

Other objects and advantages will become apparent in the following specification when considered in the light of the attached drawings, in which:

Figure 1 is a top plan view of the invention.

Figure 2 is an enlarged fragmentary transverse section taken along the line 2—2 of Figure 1, looking in the direction of the arrows.

Figure 3 is a fragmentary longitudinal sectional view of the conveying mechanism.

Figure 4 is a fragmentary perspective view of the conveyor members and load support members.

Figure 5 is a fragmentary perspective view of the short slabs conveying member.

Figure 6 is a fragmentary top plan view of a modified form of the invention.

Referring now to the drawings in detail wherein like reference characters indicate like parts throughout the several figures, the reference numeral 10 indicates generally a slab conveying and dumping mechanism constructed in accordance with the invention.

The conveyor 10 includes an elongated endless inverted U-shaped channel member 11 having a plurality of longitudinally spaced horizontally aligned rollers 12 journalled on opposite sides thereof. A plurality of conveyor members 13 are supported in end-to-end relation on the rollers 12 and have a connecting bar 14 extending therebetween and engaging in slots 15 in each end of the conveyor members 13. The bars 14 are pivotally connected to the conveyor members 13 by pivot pins 16.

A drive mechanism, generally indicated at 17, engages the conveyor members 13 and moves them along the channelway 11.

Each of the conveyor members 13 have a U-shaped fitting 18 secured to the under side thereof intermediate the opposite ends thereof. A bar 19 is secured to the U-shaped fitting 18 by means of a longitudinally extending pivot pin 20 to permit transverse swinging movement of the bar 19. Each of the bars 19 are provided with an angularly offset end portion 21 which slopes outwardly and upwardly from the lower end of the bar 19.

A support plate 22 is rigidly secured at its opposite ends to an adjacent pair of offset end portions 21 to provide a support for short lengths of material. The support plates 22 are arranged in longitudinally spaced relation along the conveyor 10.

The channelways 11 are provided with a pair of brackets 23 which extend laterally and downwardly from the channelway 11 on the side thereof toward which the offset end portions 21 extend. A bracket 24 is secured to the opposite side of the channelway 11 and depends therefrom substantially perpendicularly thereto. A pulley 25 is journalled in each of the brackets 23, and another pulley 26 is journalled in the bracket 24, with the pulleys 25, 26 lying in the same horizontal plane.

An endless belt 27 is trained about the pulley 25 and the pulley 26 to provide a relatively long run 28 extending parallel to the channelway 11, and a somewhat shorter run 29 extending at an angle to the channelway 11 underlying the conveyor member 13 in a position to be engaged by the bars 19.

In the use and operation of the invention as illustrated in Figures 1 through 5, slabs from saw mills are supported on the offset end portions 21, as shown in broken lines in Figure 4, with the conveyor members 13 moving longitudinally in the channelway 11, and as the bars 19 engage the run 29 of the endless belt 27 they are pivoted on the pivot pin 20 outwardly, as illustrated in dotted lines in Figure 2, until the bar 19 passes beyond the pulley 26 with the result that the slab supported on the offset end portion 21 is dumped therefrom into a burning pit 30, or other suitable container.

In Figure 6 of the drawings, a modified form of the invention is shown wherein the burning pit 30A is positioned substantially offset from the line of the conveyor 10 so that the flames from the burning pit 30A will not consume the conveyor 10.

Having thus described the preferred embodiments of the invention, it should be understood that numerous structural modifications and adaptations may be resorted to without departing from the scope of the appended claims.

What is claimed is:

1. A slab carrying and dumping conveyor system comprising an elongated endless inverted U-shaped channelway, a plurality of longitudinally spaced horizontally aligned rollers journalled on opposite sides of said channelway, a plurality of conveyor members arranged in end-to-end relation and supported on said rollers, a link extending between said conveyor members and pivotally attached thereto connecting said conveyor members in end-to-end relation, a load supporting hook pivotally secured in depending relation to each of said conveyor members, and an endless belt supported on said channelway with one run thereof extending at an angle to said conveyor members in a hook engaging position therebeneath for engaging and pivoting said hooks from a carrying position to a dumping position.

2. A device as claimed in claim 1 wherein said endless belt is mounted on pulleys carried by brackets secured to said channelway.

3. A device as claimed in claim 1 wherein a support plate extends between and is integrally connected to adjacent pairs of hooks in spaced relation along said conveyor to provide means for supporting and transporting relatively short slab lengths.

References Cited in the file of this patent
UNITED STATES PATENTS

| | | |
|---|---|---|
| 581,131 | Pancoast | Apr. 20, 1897 |
| 591,085 | Schlickeysen | Oct. 5, 1897 |
| 1,907,894 | Stevens et al. | May 9, 1933 |
| 2,160,699 | Kelley | May 30, 1939 |